W. A. BOYDEN.

Assignor, by mesne assignments, to C. J. DOUGHERTY.

Metallic Piston-Packing.

No. 8,717. Reissued May 20, 1879.

Witnesses.

Thomas J. Bewley,

Herman Koechor.

Inventor.

William A. Boyden.

per Stephen Ustick Attorney

UNITED STATES PATENT OFFICE.

WILLIAM A. BOYDEN, OF NEW YORK, N. Y., ASSIGNOR, BY MESNE ASSIGNMENTS, TO CAROLINE J. DOUGHERTY.

IMPROVEMENT IN METALLIC PISTON-PACKINGS.

Specification forming part of Letters Patent No. 143,956, dated October 28, 1873; Reissue No. 8,717, dated May 20, 1879; application filed April 9, 1879.

*To all whom it may concern:*

Be it known that I, WILLIAM A. BOYDEN, of the city, county, and State of New York, (lately of Harrisburg, in the county of Dauphin and State of Pennsylvania,) have invented an Automatic Piston-Packing, of which the following is a specification.

My invention consists of a series of metallic blocks provided with springs, in combination with the piston-head and its packing-rings, the blocks having inclined edges, which fit corresponding inclines of the hub of the piston, and curved edges opposite thereto, which fit the inner intermediate packing-ring.

Each of the inclined blocks or wedges is set out against the packing-rings independently of all the others, by means of a spring in a suitable recess, in such a manner as to cause the incline of the block to bear upon the inclined bearing, and thus produce a radial outward inclination of the wedge.

I make the springs of sufficient strength to take up the wear of the cylinder and packing, and thus dispense with the necessity of frequently overhauling the piston, incidental to other modes of construction.

Figure 1:
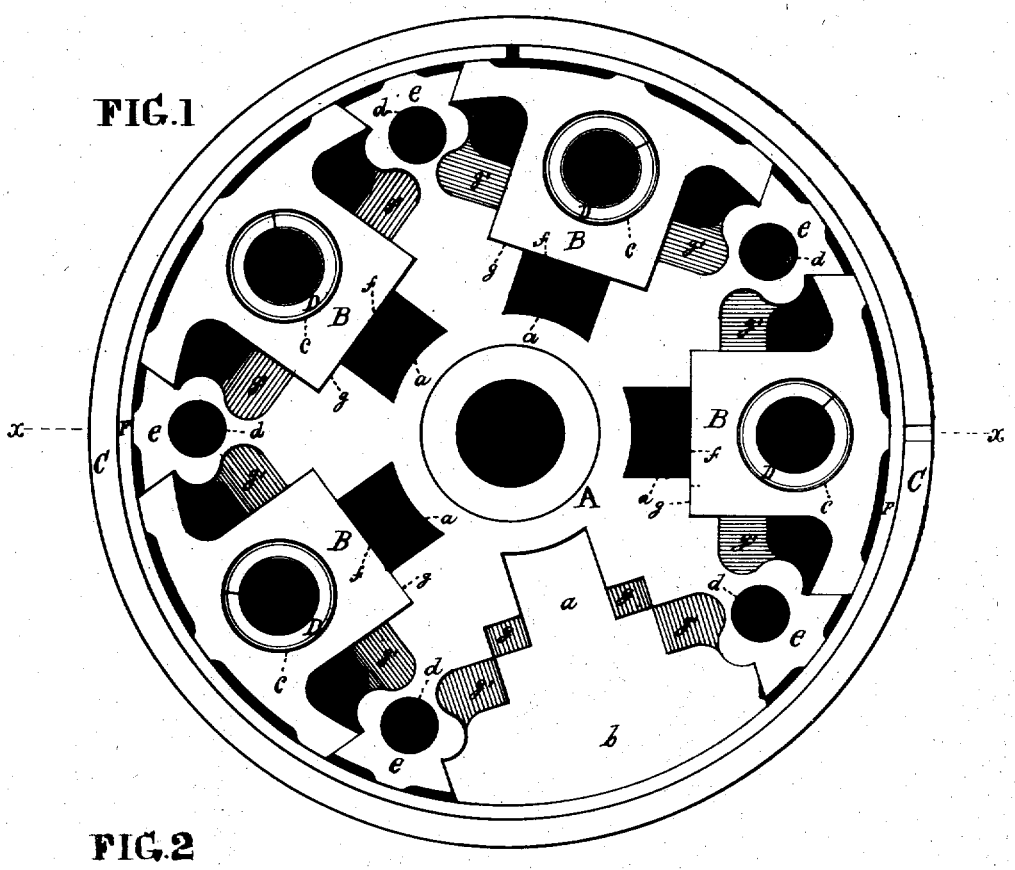
Figure 2:
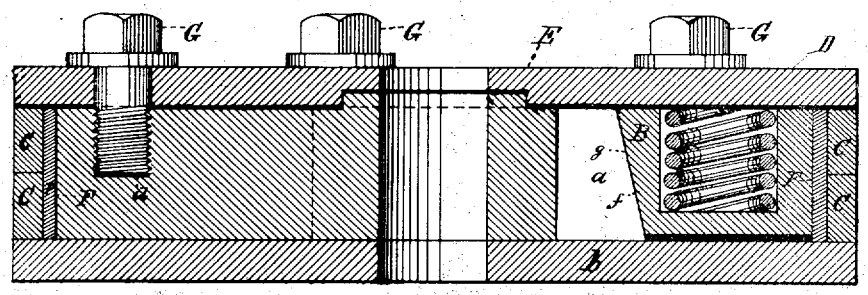
Figure 3:
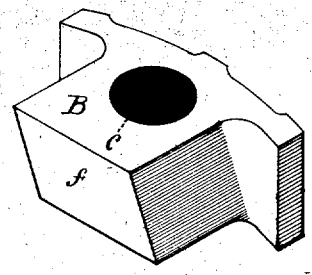

In the accompanying drawings, which make a part of this specification, Figure 1 is a face view of the piston with the follower E removed to show my improved mode of setting out the packing. Fig. 2 is a cross-section at the broken line *x x* of Fig. 1, with the follower E in its place. Fig. 3 is a perspective view of one of the blocks B.

Like letters of reference in all the figures indicate the same parts.

A represents the piston-head, which has a series of openings or recesses, *a*, between the arms *e*, and extending in depth to the plate *b*. In these recesses are placed metallic inclined blocks or wedges B for setting out the packing-rings C C, to the bore of the cylinder. The wedge form is given to the blocks by means of the incline *f* of their inner edge, the outer and curved edge being square to fit against the intermediate ring, F, which bears upon the packing-rings C C.

In the drawings, the incline *f* of each wedge B is represented as bearing against two corresponding inclines, *g g*, of the head A instead of a single incline the whole width of the incline *f*, the middle portion of the inclined surface being cut away to lighten the head A, and facilitate the fitting of the wedge.

Each wedge has a recess, *c*, which is provided with a spring, D, seated upon the bottom of the recess, the outer end of the spring being pressed upon by the follower-plate E, which is secured in place in the usual manner by the screw-bolts G, which enter the tapped holes *d* of the arms *e*.

The operation is as follows: The pressure of the springs D upon their seats causes the bevel-edges *f* of the blocks or wedges B to press with sufficient force upon the inclines *g* of the head A between the guiding-shoulders *g'* to produce a radial outward force of said wedges upon the packing-rings C C at all times, and thus to automatically keep them set to the bore of the cylinder.

As the packing is adjusted by the force of each wedge separately and independently of all the others, any irregularity of the wearing of the cylinder is compensated for, so as to insure at all times a complete and easy fitting of the packing upon the cylinder at all points of the circumference of the piston.

I claim as my invention—

1. A series of blocks or wedges, B, each having a recess, *c*, in one of its flat sides, provided with a spring, D, adapted to press against the inner flat side of the follower-plate of the piston, and an inner inclined edge adapted to bear against an incline or inclines at the hub of the piston-head in such a manner as to give a radial outward movement to the wedge for setting out the packing, substantially as set forth.

2. The combination of the inclined blocks or wedges B, having an incline, *f*, at their inner edge, a curved outer edge, and a recess, *c*, provided with a spring, D, with the piston-head A, having openings or recesses *a* and inclines *g*, the packing-rings C C and F, and the follower E, substantially in the manner and for the purpose set forth.

WM. A. BOYDEN.

Witnesses:
J. P. COWLES,
B. F. NEISWENDER.